Figure 1:
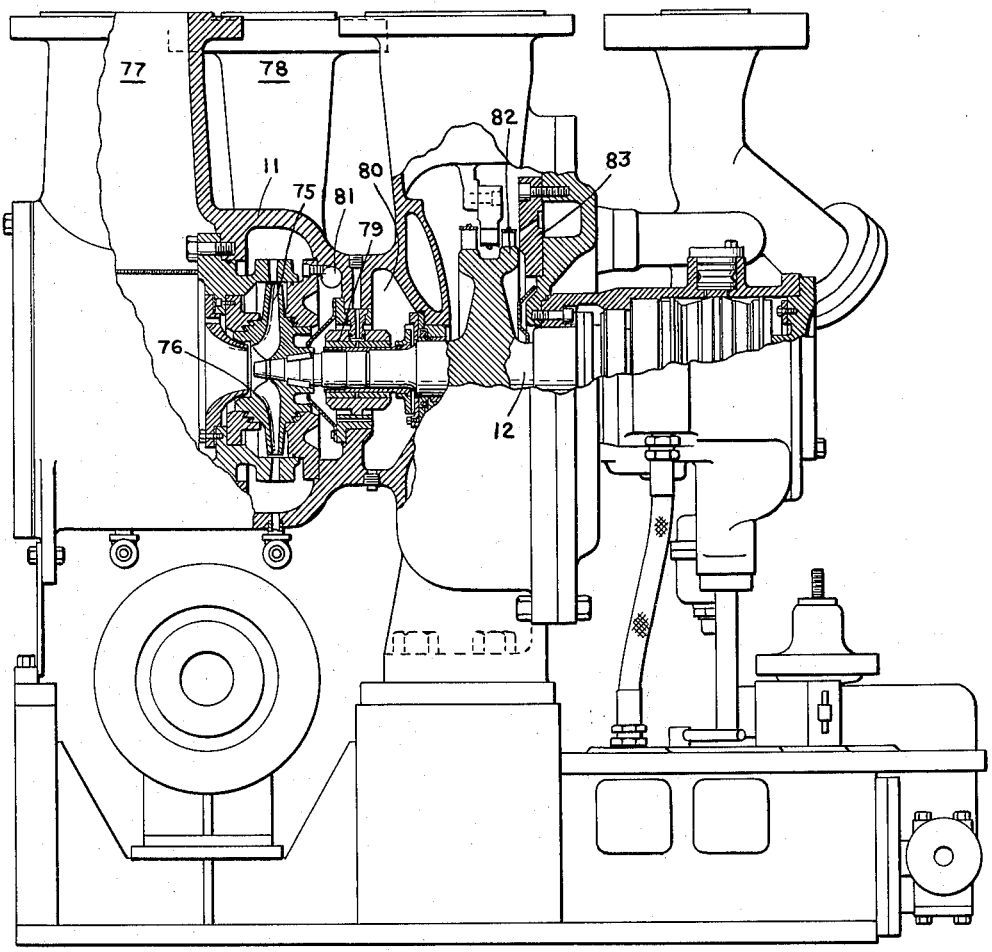

May 10, 1966 J. G. WILLIAMS 3,250,221
TURBO MONOBLOC PUMP WITH HYDROSTATIC-HYDRODYNAMIC THRUST BEARING
Filed June 18, 1964 5 Sheets-Sheet 1

JOHN G. WILLIAMS
INVENTOR.
BY Daniel H. Bobis
atty

JOHN G. WILLIAMS
INVENTOR.

JOHN G. WILLIAMS
INVENTOR.

BY Daniel H. Bolin
Atty

May 10, 1966 J. G. WILLIAMS 3,250,221
TURBO MONOBLOC PUMP WITH HYDROSTATIC-HYDRODYNAMIC THRUST BEARING
Filed June 18, 1964 5 Sheets-Sheet 4

JOHN G. WILLIAMS
INVENTOR.

BY *Daniel H. Bobis*
*Atty.*

United States Patent Office 3,250,221
Patented May 10, 1966

3,250,221
TURBO MONOBLOC PUMP WITH HYDROSTATIC-
HYDRODYNAMIC THRUST BEARING
John G. Williams, Warren Township, N.J., assignor to
Worthington Corporation, Harrison, N.J., a corporation
of Delaware
Filed June 18, 1964, Ser. No. 376,132
13 Claims. (Cl. 103—87)

This invention relates generally to a pump driven by a turbine where the pump and driver are on the same shaft, and it is directed more particularly to means for adjusting axial forces along the shaft at static conditions or at dynamic conditions of operations.

It is an object of this invention to provide a bearing which can absorb static or dynamic forces exerted axially on rotating equipment. It is another object of this invention to adjust both the static and dynamic forces within preferred limits, as the rotating equipment progresses from static to dynamic normal speed.

Another object of the invention is to provide fluid passages integrated into a thrust collar, and cooperative coacting faces in the stationary members of the bearing.

A still further object of the invention is to provide means for continuing adjustment of the fluid pressure difference across the thrust bearing.

It is an object of the invention to use the material being pumped as a lubricating fluid, thereby improving reliability by avoiding seals to separate two fluids.

It is another object of the present invention to supply a bearing lubricating fluid through an integrated bearing fluid pumping means which is not independent of the pump unit, but which is a part of the same rotating structure on which the pump unit is mounted, and is incorporated into a thrust collar.

Another object of the invention is to utilize the fluid being pumped, water for example, as the fluid lubricant, although other fluids may be used as lubricants.

It is an object of this invention to provide a thrust bearing resistant to deterioration because of maloperation of valves and external shocks effecting rotating equipment, either of which may result in enormous loads exceeding normal static and dynamic forces.

It is another object of this invention to provide a structure which is highly resistant to transitory loads and which is able to provide efficient lubrication and flexurable support for the shaft; this is accomplished by the novel application of swivelable members referred to as leveling rings.

A further object of this invention is to provide a structure that can operate with a control system which will fail-safe under most conditions of maloperation, and which control system will insure against damage to the turbo monobloc pump units as well as the entire system under conditions of improper control, neglect or mismanagement.

It is yet a further object of the invention to provide normalizing forces to be exerted on the thrust bearing during all conditions of operation, so that there will be a continuing adjustment of the fluid pressure differences across the thrust bearing, to constantly maintain the fluid pressure difference within preferred limits under both normal and abnormal operating conditions.

Figure 2:
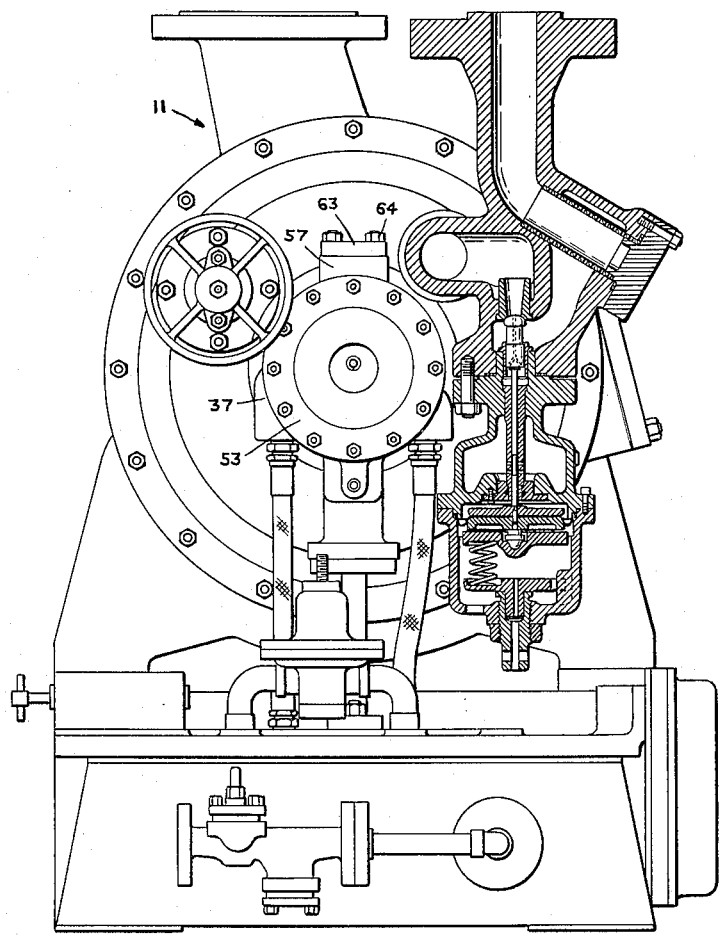
Figure 3:
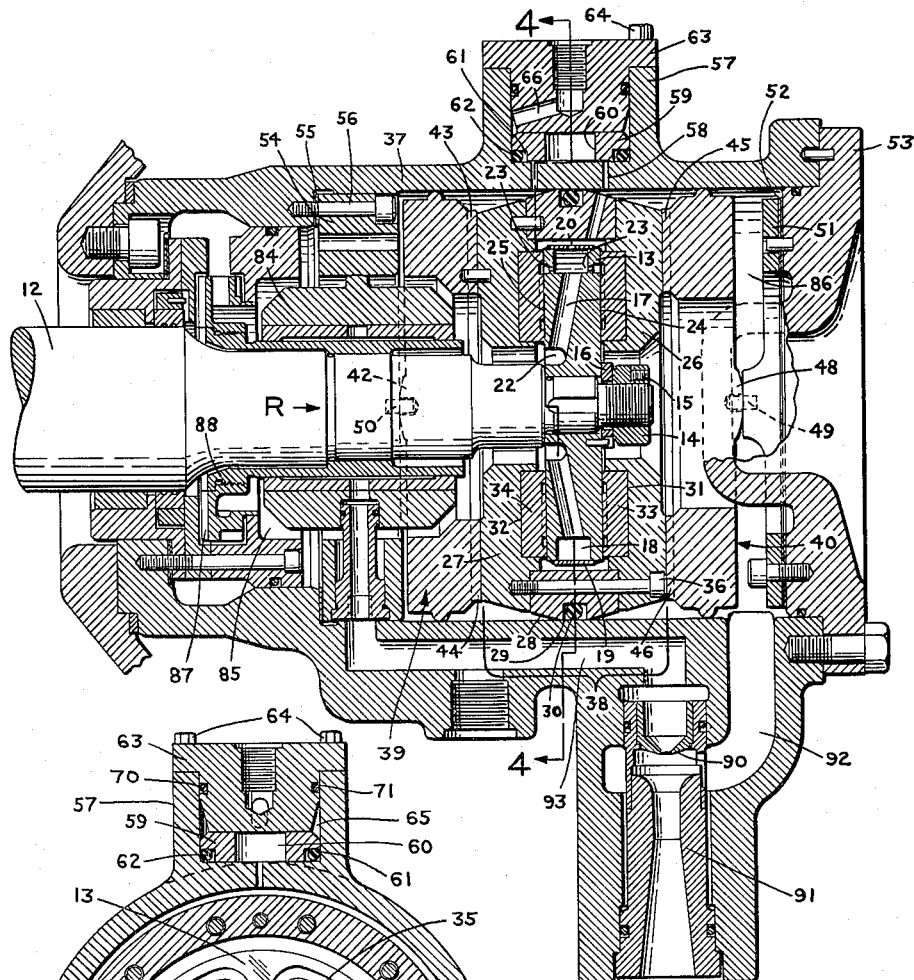
Figure 4:
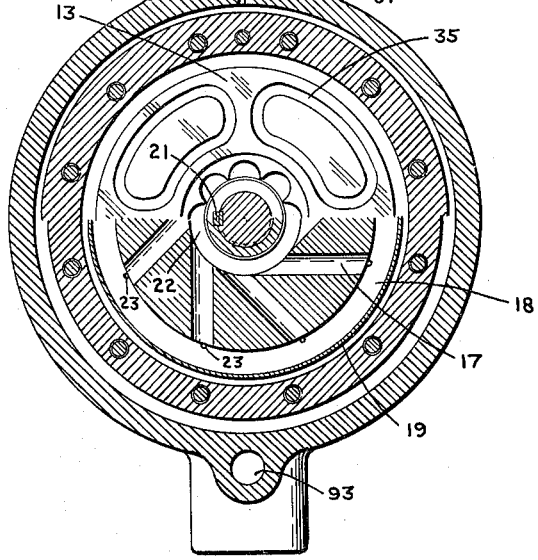
Figure 5:
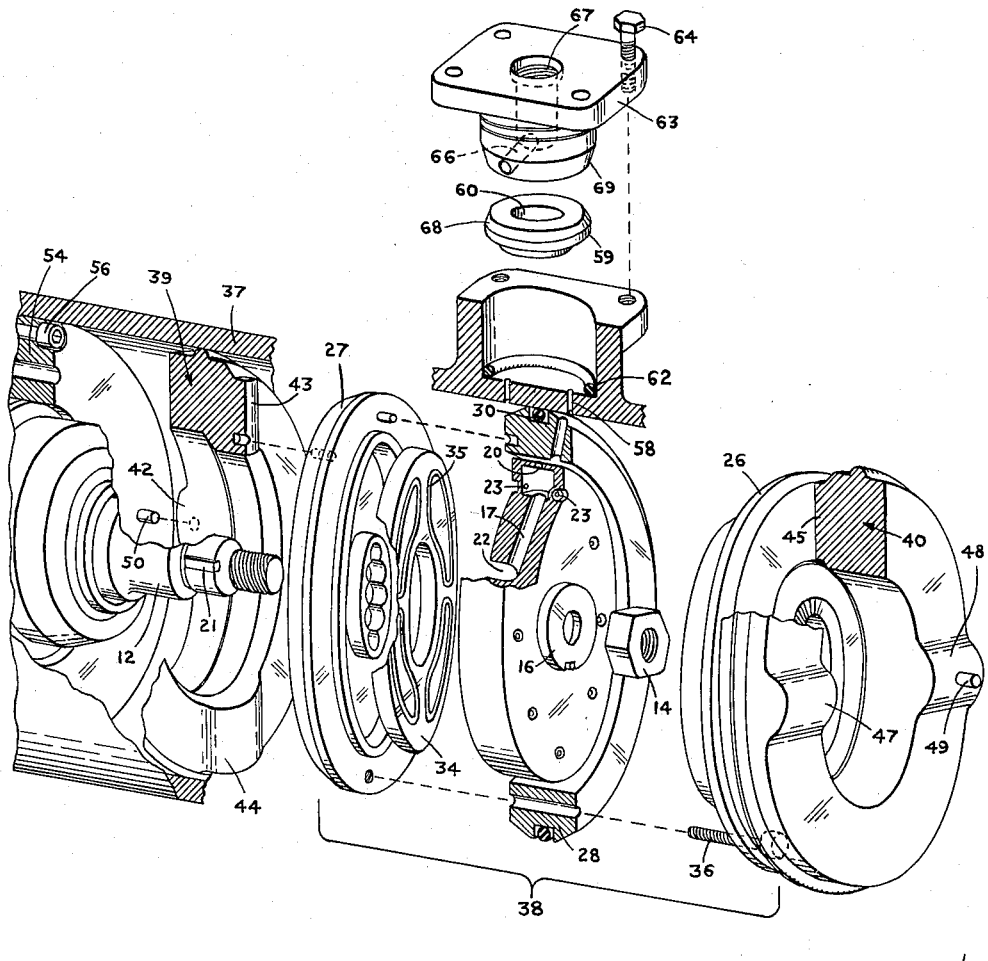
Figure 6:
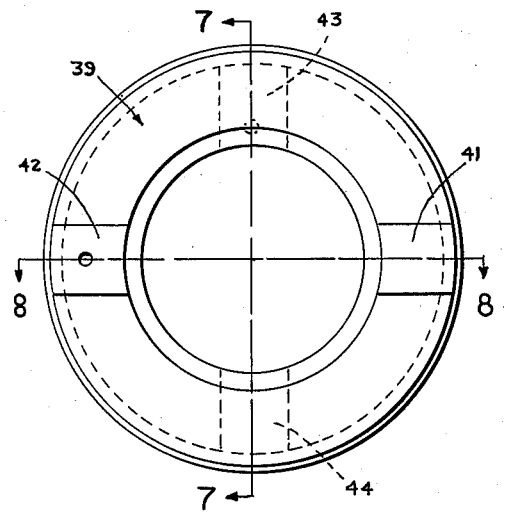
Figures 7, 8:
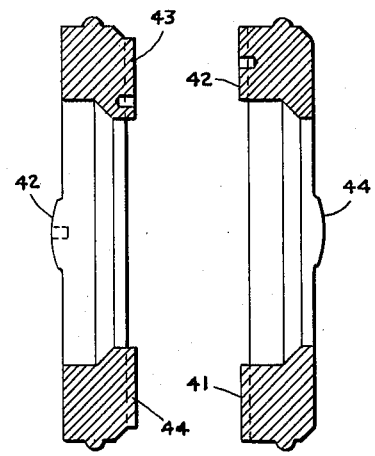
Figure 9:
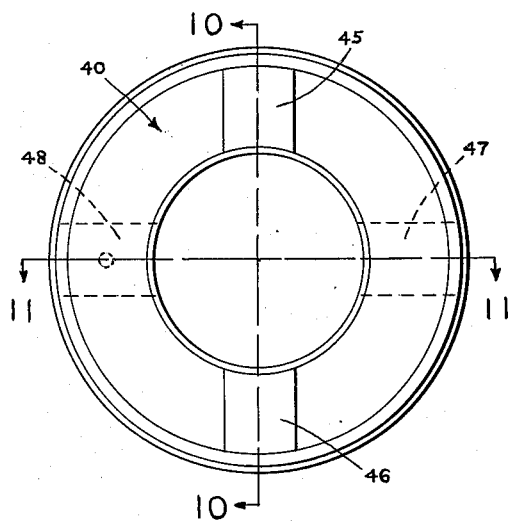
Figures 10, 11:
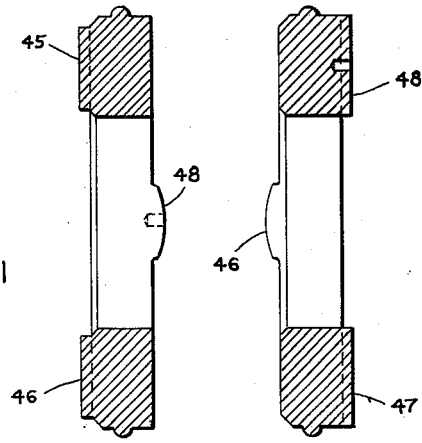

These objects and advantages as well as other objects and advantages may be attained by the device shown by way of illustration of the invention in the accompanying drawing and referred to in the accompanying specification. In the drawings:

FIGURE 1 is a side elevational view;
FIGURE 2 is an end elevational view;
FIGURE 3 is a vertical sectional view of the thrust bearing;
FIGURE 4 is a vertical sectional view of the bearing cage taken on the line 4—4 in FIGURE 3;
FIGURE 5 is an exploded view of the thrust bearing;
FIGURE 6 is a side elevational view of a first leveling ring;
FIGURE 7 is a sectional view taken on the line 7—7 in FIGURE 6, looking in the direction of the arrows;
FIGURE 8 is a sectional view taken on the line 8—8 in FIGURE 6, looking in the direction of the arrows;
FIGURE 9 is a side elevational view of a second leveling ring;
FIGURE 10 is a sectional view taken on the line 10—10 in FIGURE 9, looking in the direction of the arrows; and
FIGURE 11 is a sectional view taken on the line 11—11 in FIGURE 9, looking in the direction of the arrows.

*The turbine and pump*

Referring now to the drawings in detail, FIGURE 1 shows a turbine driven water pump unit 11. The utility of the present thrust bearing invention is not necessarily confined to its use in such turbine and water pump unit. It may also have utility in any structure in which there is a rotating shaft subjected to axial forces. The present thrust bearing structure is of general application in each apparatus.

There is a shaft 12 extending from the turbine and water pump unit 11. This shaft is supported at points intermediate of its ends by the bearings illustrated in U.S. Patent 2,933,044, of April 19, 1960, to J. G. Williams, and which structures will not be referred to in detail since they are not a part of this invention. The outer end of the shaft 12 is provided with a thrust collar 13 (see FIGURE 3) which is structurally supported and retained thereon by a washer 16 and a nut 14. The nut is locked on the end of the shaft 12 by a set screw 15.

*The thrust collar*

The unique thrust collar incorporates a means to develop centrifugal pressure which is used to operate the bearing. Referring to FIGURES 3 and 4, the thrust collar 13 contains a number of generally radial internal passages 17 extending to an annular peripheral channel 18 in the thrust collar 13. This channel 18 extends inwardly from the peripheral edge of the thrust collar 13. An external ring 19 is shrunk onto the thrust collar 13 and welded in place so that the annular channel 18 is enclosed. The channel 18 communicates with a plurality of lateral passages 23 and with a peripheral radial passage 20, through which peripheral passage 20 centrifugal force will discharge dense foreign material that may enter the channel 18 and plug up the lateral orifices 23. The foreign material centrifugally seeks the orifice 20. Passage 20 discharges this material before it can come into contact with bearing surfaces where it might cause damage. Since such foreign material is invariably more dense than the lubricant fluid, it will seek the discharge passage 20, rather than the lateral discharge orifices 23.

The thrust collar 13 is affirmatively engaged with the shaft 12 by the key 21. The thrust collar 13 has an annular intake port 22 on the inner face 25, through which fluid enters the thrust collar 13, and is centrifugally impelled through the passages 17 and out into the channel 18. A large centrifugal pressure is developed in the channel 18 which pressure rises as the speed of rotation squared. In a typical installation, rotating at 12,000 r.p.m., it has been found that at the intake port 22, the pressure of the fluid may be 80 p.s.i., and in the channel 184 p.s.i., and vastly higher if the shaft rotates at much higher speeds, or the thrust collar 13 is increased in size. On the lateral edges of both side faces of the thrust collar 13, there are a plurality of lateral orifices or discharge ports 23. These discharge ports 23 extend from the channel 18 to both the outer face 24 and to the inner face 25.

Thrust collar bearing

The bearing for the thrust collar is formed of an outer bearing plate 26 (see FIGURE 3) and an inner bearing plate 27. These plates 26, 27 are separated from each other a predetermined distance by a generally annular spacer 28 having a convex peripheral cross section. The spacer 28 has an external annular peripheral channel 29 to carry the O-ring 30. The O-ring 30 will invariably be intimately engaged with the interior cylindrical bore of the housing 37 because the swiveling of the bearing cage assembly will not be great enough to disengage such contact. Thereby, a pressure differential can be achieved across the bearing cage assembly. Such pressure differential is of vital importance to the turbo monobloc pump, as described later.

The surfaces of the outer and inner bearing plates 26, 27 are parallel to each other and also parallel to the coacting faces of thrust collar 13. On the face of each of the inner and outer bearing plates 26, 27, opposite the thrust collar 13, there are annular recesses 31, 32. In each of these recesses 31, 32, there is seated an annular bearing insert 33, 34. These bearing inserts are in general opposition to the faces 24, 25 of the thrust collar 13. The inserts are made of a low friction material which will be compatible with the fluid used as the lubricant. These materials are well known in the art and need not be further identified; it, however, being noted that certain materials are compatible with oil, others with water, and still other bearing insert materials suitable with other lubricants. The bearing inserts, in preferred form, are provided with continuous surface channels or pockets 35, which are shown as loops subtended by a quarter or 90° sector of the surface of the bearing insert, where the bearing insert is in opposition to the side faces 24, 25 of the thrust collar 13. It is noted, however, that it is not necessary that these channels 35 be of this extent or configuration as shown in FIGURES 4 and 5. It is preferable that the channels 35 all be equal and should not extend beyond a 120° sector of the bearing insert 33, 34. These channels or pockets 35 are loaded by the lubricant fluid issuing from the orifices 23. The bearing plates 26, 27, and the spacer 28 are integrated by the bolt 36. The assemblage of bearing plates 26, 27 and spacer 28 is dimensioned to fit with very close tolerance within the housing 37, with the O-ring 30 in tight sealing engagement with the housing 37. For convenience in identification, this assemblage will be referred to as the bearing cage 38.

The bearing cage 38 is responsive to any possible eccentric movement of the thrust collar 13. Eccentric movements of the thrust collar 13, referred to as runout, almost inevitably result from the impossibility of achieving manufacturing perfection and also may result from mechanical deviation when the thrust collar is affixed to the shaft 12. Thus, it is recognized that runout is a factor to be dealt with to avoid malfunctioning of the bearing. A further factor to be dealt with is the small degree of axial movement in either direction of the shaft 12. Forces exerted upon the shaft 12 may be either static or dynamic in nature. The spacer 28 is so dimensioned that the clearance between the thrust collar 13, and the bearing inserts 33, 34 is of the order of approximately $1 \times 10^{-2}$ of an inch total for both sides of the thrust collar 13. The bearing cage 38 has its peripheral edges essentially spherical about the center line which is the intersection of its longitudinal and latitudinal axes. Thus, the bearing cage 38 may swivel within the housing 37 in adapting itself to the small but critical angular movement of the thrust collar 13 and permit maintenance of general parallelism between the bearing inserts 33, 34 and either or both of the inner and outer faces 25, 24. The bearing cage 38 must be supported in the housing 37 and so, since it must be able to swivel, it must be flexibly supported.

Leveling rings

Such flexible support is provided by a pair of leveling rings 39, 40. They are generally annular members of steel provided with pairs of diametrical, arcuate rocking surfaces or enlargements on one face and similar diametrical arcuate rocking surfaces on their opposite face; the rocking faces are on diameters 90° offset from each other on opposite faces of each rocker member 39, 40. The opposite leveling ring is a mirror image of the first as shown in FIGURES 7, 8 and 10, 11. A pair of rocking surfaces 41, 42 are on the outer face of the leveling ring 40 and another pair of corresponding, opposite, diametrical rocking surfaces 43, 44 are on the inner face of the leveling ring 40; a pair of rocking surfaces 45, 46 are on the inner face of the leveling ring 40 and another pair of corresponding, opposite, diametrical rocking surfaces 47, 48 are on the outer face of the leveling ring 39. When the leveling rings 39, 40 are assembled in juxtaposition with the bearing cage 38, it is of vital importance that a specific relationship be maintained between the opposite pairs of rocking surfaces 41–42, 43–44, 45–46, 47–48; that is to say, they must be engaged with the outer surface of the support ring 54 and end plate 51 in exact opposition with each other, and furthermore must be continuously in that position. As will appear from FIGURE 5, locating pin 49 engages the leveling ring 40 in exact opposition with the leveling ring 39 which in turn is held to support ring 54 by means of locating pin 50, so that the corresponding rockers 43–44, 45–46, will be permanently positioned opposite each other and the corresponding pairs of rockers 41–42, 47–48, will also be opposite each other.

The leveling rings 39, 40 permit swivelable action of the bearing cage 38 with a minimal amount of contact between surfaces of the various members so that the frictional restraint to such swiveling will be extremely low. The outer end of the housing 37 is closed by an end plate 51 which is attached to the cover 53. Since the end plate 51 governs the position of the leveling ring 40, shims 52 are interposed between the end plate 51 and the cover 53 to provide for manual adjustment. The opposite leveling ring 39 is positioned by support ring 54, which is attached to the housing 37 by the bolts 56 with intervening shims 55, to allow for manual adjustment of the position of the leveling ring 39. The importance of these shims 52, 55 is related to the necessity for the precise positioning of the shaft 12 with respect to any other fixed structural elements. The construction provided allows flexibility in such adjustment of the shaft 12 and accommodates manufacturing tolerances.

Automatic gas vent

Inevitably, in fluid containing structures such as the one under consideration, gases may undesirably accumulate in the housing 37. Such gaseous inclusions, if sufficiently great, may prevent the fluid which serves as a lubricant from operating between all of the coacting surfaces. Since such gaseous inclusions will collect at the top of the housing 37, it is important to provide means for their continuous removal. It is also important that such means be automatic, and not dependent upon continuous conscious monitoring by persons in charge of the apparatus. Such a relief mechanism for the discharge of gaseous inclusions from the housing 37 is shown in FIGURES 3, 4 and 5. At the top of the housing 37, there is provided an enlargement 57. Passages 58 communicate from the interior of the housing 37 into the enlargement 57. In the bottom of the enlargement 57, a platen or disc 59 with a central bore 60 is provided. The bore 60 may not be aligned with the air passages 58. The disc 59 is provided with an annular bottom recess 61 to accommodate an O-ring 62. Seated on the disc is a plug 63 which closes the enlargement 57. This plug 63 is bolted to the enlargement 57 by bolts 64. The disc 59 has a mitred, annular top peripheral edge 68. The plug 63 has a mitred, annular bottom peripheral edge 69. Together, they define (FIGURE 3) an annular chamber 65. A passage 66 in the plug 63 communicates with the chamber 65. The passage 66 in the plug 63 connects with the central bore 67 of the plug. The O-ring 70, in the channel 71 of the plug 63 seals the space between the plug 63 and the enlargement 57. Due to manufacturing limitations, the coacting surfaces of plug 63 and disc 59 are never perfectly flat, and as a result, a very small but well defined passage for the escapee of gases exists between these two coacting faces of plug 63 and disc 59. Due to the great difference in viscosities between the unwanted gases and the liquid lubricant, leakage of the lubricant between these coacting faces is extremely small whereas the undesired gases can pass between these coacting surfaces with little restraint.

Operation of thrust bearing

Thrust collar 13 is never perfectly square to the centerline of shaft 12 due to manufacturing limitations. Consequently, when shaft 12 turns, one portion of collar 13 will advance toward the bearing insert 33 while that portion of collar 13 which is opposite will recede from the opposite bearing insert 34. Unless corrective means is provided to readjust the angular position of bearing inserts 33, 34, the coacting faces of thrust collar 13 and bearing insert 33, 34 would at that instant not be parallel. This condition would adversely affect the load capacity of the thrust bearing. Correction means for adjustment of the angular position of bearing inserts 33, 34 is automatically and continuously accomplished. The effluent fluid discharging through lateral orifices 23 in thrust collar 13, passes directly to the continuous channels 35 in each quadrant of bearing inserts 33, 34. The pressure in any given channel 35 and the sector of the bearing insert subtended by it, is dependent upon the pressure in channel 18 of collar 13, the size of lateral orifices 23, and the clearance between that particular portion of bearing insert 33 and the coacting face of collar 13. Small clearance between the coacting faces will result in higher pressures in the channel 35 and the area subtended by it, whereas larger clearances will have the opposite effect. Consequently, the runout of collar 13, which would tend to vary the clearance between the bearing inserts 33, 34 with respect to faces 24, 25 of the collar 13, will immediately create higher pressures in that sector of bearing insert 33 where clearances are smallest, and lower pressures where clearances are largest. Furthermore, the pressure over the area subtended by channel 35 results in a force which, by its mean radial distance from the shaft centerline, produces a moment. If the pressures on bearing insert 33 are equal all around, the moments are balanced and then no angular movement of bearing inserts 33, 34 will occur by reason of the thrust collar construction. However, if there is a difference of pressures on diametrically opposite areas subtended by the channels 35, a resultant moment will develop to cause bearing inserts 33, 34 to swivel angularly until equal pressures all around are restored. At this time, the clearance of bearing inserts 33, 34 with respect to the coacting faces 24, 25 of collar 13 is equal all around, and at that time the coacting faces of bearing inserts 33, 34 and collar 13 are exactly parallel.

The leveling rings 39, 40 are used to allow bearing inserts 33, 34 to swivel so that parallelism between coacting faces of the bearing inserts and collar 13 is achieved; the net result of this is that maximum load capacity of the bearing assembly is obtained. It is evident that any deviation from parallelism between the coacting faces of the thrust collar and the bearing inserts 33, 34 will generate restoring moments to reestablish exact parallelism and, therefore, maximum load capacity.

The pump and turbine

On the opposite end of the shaft 12, from the end upon which the thrust collar 13 is mounted, a pump impeller 75 is attached to the shaft 12. The eye 76 of the impeller receives the fluid to be pumped from the intake port 77, and discharges the fluid into the discharge port 78. This end of the shaft is supported by the journal bearing 79, described more particularly in U.S. Patent No. 3,033,120, dated May 8, 1962, of John G. Williams. Journal bearing 79 is located in a cavity in the housing and is bathed in the fluid being pumped. The pressure in this cavity 80 is maintained at a higher level than the pressure in the eye 76 of the impeller 75. The fluid in the cavity 80 is normally maintained at a predetermined pressure by establishing an appropriate dimension for a discharge orifice 81 in that cavity 80. The effluent passing from orifice 81 is conducted back to the reservoir from which the intake port 77 received its fluid. Mounted on the center of the shaft 12 is a turbine wheel 82. The turbine wheel 82 is driven by high pressure steam introduced into the nozzle block 83 in such a manner as to create a uniform pressure around the turbine wheel after passing through the blading. The importance of this utilization of high pressure steam is to minimize seal force imbalance originating from the turbine wheel 82 itself. The turbine wheel 82 itself is mounted on the shaft 12 substantially in a state of dynamic balance for the same reason: that undesired forces may not be exerted upon the shaft 12.

In substantially symmetrical arrangement with respect to the vertical centerline of turbine wheel 82, an identical journal bearing 84 is positioned on the other side of the turbine wheel 82 in correspondence with the first journal bearings 79. The position of the impeller 75 on the shaft 12, and the thrust collar 13 on the opposite end of the shaft 12, are carefully calculated to produce a state of equilibrium by reason of their symmetrical spaced relation to each other with the central turbine whel 82 and intermediate journal bearings 79, 84. The journal bearing 84 is positioned in a cavity 85 similar to the cavity 80 in which the journal bearing 79 is located. These cavities 80, 85 are interconnected and the ambient pressures are identical. The end cavity 86 beyond the thrust collar 13 is interconnected with the inlet port 77, and consequently the pressures therein are identical under starting conditions.

By reason of the fact that the turbo-monobloc pump assembly is in a state of equilibrium, if the pressure in the intake port 77 and in the cavity 86 are equal, the pressures in cavities 80 and 85 are also equal to each other. No residual axial force will be imposed upon thrust collar 13 when conditions are normal.

Operation of pump assembly

During normal operation, minor deviations in pressure between the related cavities 80, 85 and the intake port 77 and end cavity 86 will inevitably occur, thereby causing shaft 12 and the parts assembled thereon to wander back and forth between the clearance limits between the thrust collar 13 and the bearing inserts 33, 34. The degree of such wandering may be of sufficient magnitude as to create undesirable vibrations in axial directions. It is known that such random wandering can be overcome by a predetermined loading of appropriate magnitude and direction, wherein the structure is best able to sustain such loading.

The cover 53 for the end of the housing is secured thereto by a number of bolts as shown in FIGURE 2. The cover 53 supports the end plate 51. Forces communicated to the leveling ring 40 from the thrust collar 13 are, therefore, strongly supported.

A reduction of pressure in the cavity 86 will produce a resultant force in the direction of the arrow R shown in FIGURE 3. This force R is conveyed from the thrust collar 13 to the leveling rings 40, end plate 51 and cover 53 to the bolts which attach the end cover 53 to the housing.

Axial force balance control

Between the turbine wheel 82 and the bearing 84, an auxiliary impeller 87 is mounted on the bearing sleeve 88 as more particularly described in Bearing Patent 3,033,120, of May 8, 1962, to John G. Williams. The discharge line from the impeller 87 conveys fluid to lubricate bearings 79 and 84, and to power eductor assembly 89. The eductor assembly 89 has a jet 90, which discharges into a diffuser 91. Immediately adjacent to the jet 90, and anterior to the diffuser 91, a passage 92 originates and communicates with the cavity 86. By reason of the discharge of fluid from the jet 90, a region of low pressure is located in the passage 92, which simultaneously reduces pressure in the cavity 86. As the speed of the rotating equipment increases, a power fluid from auxiliary impeller 87 rises as the speed of the shaft squared, and exerts progressively increasing pressure in the passage 93, with consequent reduction of pressure in the chamber 92 and the cavity 86. The jet 90 has an orifice which is dimensioned to cooperate with the diffuser 91 to produce a predetermined preferred reduction of pressure in the cavity 86.

At zero speed, the load bearing capacity of the thrust collar 13 is minimal because there is no established film thickness between the coacting faces of the thrust collar 13 and the bearing inserts 33, 34. As the pump commences to operate, and the speed of the shaft 12 increases, the load bearing capacity of the thrust bearing rapidly rises, because the pump built into thrust collar 13 generates pressure as the speed squared. With increased load-bearing capacity due to operation at higher and higher speeds approaching maximum normal operating speed, the inherent construction generates an increasing force R whose direction is indicated by the arrow in FIGURE 3. Increase in the force R is sustained because of the higher load capacity of the thrust collar 13 at these higher speeds. As already noted, thrust collar 13, as a result of the force R, is sustained by the bearing assembly supporting structure. Increase in force R is desirable because with increased speed, undesired and unintended random variations in pressures in inlet port 77, chambers 80 and 85, would otherwise cause corresponding random motion in an unchecked manner of the shaft assembly. Thus, under conditions of high speed operation, the force R fixedly locates the rotating assembly with respect to the supporting structure so that considerable variations under all normal as well as abnormal operating conditions in the pressures in the intake port 77 and the chambers 80 and 85 can be tolerated with ease, since they are not likely to be of sufficient magnitude to overcome the force R. When the shaft 12 returns to zero speed, the force R drops to zero and equilibrium pressures are reestablished. The thrust collar 13 is no longer subjected to the force R as it approaches zero speed, it is no longer necessary to have a finite film thickness between the face of the thrust collar 13 and the bearing inserts 33, 34. Under the wide range of operating conditions from zero to maximum speed, the thrust collar 13 is operating under conditions which are favorable to long and sustained life, coaxial forces being only applied when self-generated lubricating film thicknesses are available.

Control system

A control system for the turbo monobloc pump unit is subject of a copending patent application and is a separate invention useful, but not necessary to the subject invention.

Balance

The shaft 12 upon which the pump impeller 75, the turbine wheel 82, and the thrust bearing are mounted is in a state of static equilibrium on the journal bearings 79, 84. This is accomplished by careful counterbalancing the pump with the thrust bearing on the journal bearings. The turbine is positioned between the journal bearings at the center of the shaft. Thus, the elements of the turbo monobloc pump assembly are carefully balanced when incorporated into the pump.

Once incorporated into the pump, the force exerted by the medium introduced into the intake port 77 of the pump tends to unbalance the assembly, but a conduit connects the intake port to the opposite end of the housing whereby a substantially equal and opposite force is exerted on the outer face of the thrust bearing. Likewise, the fluid pressure in the chambers on opposite sides of the turbine, which pressures are exerted upon the pump impeller 82 and on the inner face of the bearing, are equalized by a conduit connecting them together. Thus, the fluid pressures do not tend to unbalance the assembly at zero speed. Upon commencement of operation, the assembly is in a state of complete equilibrium, so that no destructive imbalance can damage the components as operation commences.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:
1. A thrust bearing comprising
   (a) a thrust collar,
   (b) the thrust collar having a generally radial passage communicating at the outer end with a peripheral chamber, and at the inner end with an intake port,
   (c) outer and inner side-faces on the thrust collar having discharge ports communicating with the peripheral chamber,
   (d) outer and inner bearing plates disposed in opposition to the outer and inner side-faces of the thrust collar,
   (e) the bearing plates having a plurality of pockets, each confined to a sector of the surface of the bearing plates,
   (f) a portion of each pocket positioned to communicate successively with the discharge ports as the thrust collar rotates,
   (g) a spacer connecting the bearing plates together, and with them defining a bearing-cage assembly,
   (h) a peripheral surface on the spacer dimensioned to allow the bearing cage to swivel within a housing,
   (i) a housing slidably engaged with the peripheral surface,
   (j) a rotatable shaft carrying the thrust collar,
   (k) a pair of leveling rings in the housing disposed in engagement with opposite sides of the bearing cage assembly,
   (l) a first pair of arcuate, diametrical enlargements on one face of each leveling ring,
   (m) a second pair of arcuate, diametrical enlargements on the other face of each leveling ring, and each second pair of enlargements disposed on a diameter offset approximately 90° from the first pairs of enlargements, and the arcuate enlargements on the faces of the leveling rings adjacent to the bearing cage assembly in opposition to each other,
   (n) the arcuate enlargements of the leveling rings on the sides opposite those engaged with the bearing cage assembly, engaged with the housing, whereby the bearing cage assembly and leveling rings are swivelable in response to runout of the thrust collar and to shifts in shaft alignment,
   (o) the housing having a gas relief passage,
   (p) means for releasing gas from within the housing,
   (q) means for reducing fluid pressure in the housing on one side of the bearing cage assembly as the speed of rotation of the shaft increases.

2. A thrust bearing comprising
(a) a thrust collar,
(b) the thrust collar having a generally radial passage communicating at the outer end with a peripheral chamber, and at the inner end with an intake port,
(c) outer and inner side-faces on the thrust collar with discharge ports communicating with the peripheral chamber,
(d) outer and inner bearing plates disposed in opposition to the outer and inner side-faces of the thrust collar,
(e) the bearing plates having a plurality of continuous, separate, surface-pockets, each confined to a sector of the surface of the bearing plates, which sector is generally not greater than approximately 120°,
(f) a portion of each pocket positioned to communicate successively with the discharge ports as the thrust collar rotates,
(g) a spacer connecting the bearing plates together, and with them defining a bearing-cage assembly,
(h) a peripheral surface on the spacer dimensioned to allow the bearing cage to swivel within a housing,
(i) a housing slidably engaged with the peripheral surface,
(j) a rotatable shaft carrying the thrust collar,
(k) a pair of leveling rings in the housing disposed in engagement with opposite sides of the bearing cage assembly,
(l) a first pair of arcuate, diametrical enlargements on one face of each leveling ring,
(m) a second pair of arcuate, diametrical enlargements on the other face of each leveling ring, and each second pairs of enlargements disposed on a diameter offset approximately 90° from the first pairs of enlargements and the arcuate enlargements on the faces of the leveling rings adjacent to the bearing cage assembly in opposition to each other,
(n) the arcuate enlargements of the leveling rings on one side opposite those engaged with the bearing cage assembly, engaged with the housing, whereby the bearing cage assembly and leveling rings are swivelable in response to runout of the thrust collar and to shifts in shaft alignment,
(o) the housing having a gas relief passage,
(p) a cap and plate engaged with each other in the gas relief passage to achieve between them a restrictive passage dimensioned to provide viscous drag insufficient to restrain venting of gas from the housing, yet sufficient substantially to restrain liquid leakage from the housing,
(q) means for reducing fluid pressure in the housing on one side of the bearing cage assembly as the speed of rotation of the shaft increases.

3. A thrust bearing comprising
(a) a bearing cage assembly,
(b) a pair of leveling rings disposed on opposite sides of the bearing cage assembly,
(c) a first pair of arcuate, diametrical enlargements on one face of each leveling ring,
(d) a second pair of arcuate, diametrical enlargements on another face of each leveling ring, each second pair of enlargements disposed on a diameter offset approximately 90° from the first pairs of enlargements, and the arcuate enlargements on the faces of the leveling rings adjacent to the bearing cage assembly in opposition to each other, whereby swivelable motion of the bearing cage assembly is permitted.

4. A thrust bearing comprising
(a) a housing having a gas relief passage,
(b) a cap and plate engaged with each other in the gas relief passage to achieve between them a restrictive passage dimensioned to provide viscous drag insufficient to restrain venting of gas from the housing, yet sufficient substantially to restrain liquid leakage from the housing,
(c) means to engage the cap and plate together.

5. A thrust bearing comprising
(a) a thrust collar,
(b) the thrust collar having a generally radial passage communicating at the outer end with a peripheral chamber and at the inner end with an intake port,
(c) side-faces on the thrust collar with lateral discharge ports communicating with the peripheral chamber,
(d) a bearing plate disposed in opposition to the side face of the thrust collar,
(e) the bearing plate having a plurality of continuous separate channels, each confined to a sector of the surface of the bearing plate, which sector is generally not greater than approximately 120°.

6. A thrust bearing comprising
(a) a thrust collar with lateral discharge ports,
(b) outer and inner bearing plates having a plurality of continuous, separate, surface-channels each confined to a sector of the surface of the bearing plates generally not greater than 120°,
(c) a portion of each channel positioned on the outer and inner bearing plates to communicate successively with the discharge ports of the thrust collar as it rotates.

7. A thrust bearing comprising
(a) a thrust collar with lateral discharge ports,
(b) outer and inner bearing plates having a plurality of pockets each confined to a sector of the surface of the bearing plates,
(c) a portion of each pocket positioned on the outer and inner bearing plates to communicate successively with the discharge ports of the thrust collar as it rotates.

8. A thrust bearing comprising
(a) outer and inner bearing plates having a plurality of continuous, separate, surface-channels each confined to a sector of the surface of the bearing plates generally not greater than 120°,
(b) a portion of each channel positioned on the outer and inner bearing plates to communicate successively with discharge ports of a thrust collar as it rotates,
(c) a spacer coaxial with, interposed between, and connected to the bearing plates and with them defining a bearing cage assembly,
(d) a housing for the assembly,
(e) an arcuate peripheral surface on the spacer, normally tangential to the inside cylindrical surface of the housing whereby the bearing cage assembly may swivel within the housing.

9. A thrust bearing comprising
(a) a shaft,
(b) a thrust collar on the shaft,
(c) a bearing cage assembly about the thrust collar,
(d) a housing about the bearing cage assembly,
(e) an arcuate peripheral surface on the bearing cage assembly, normally tangential to the inside cylindrical surface of the housing, whereby the bearing cage assembly may swivel within the housing.

10. A thrust bearing comprising
(a) outer and inner bearing plates having a plurality of pockets each confined to a sector of the surface of the bearing plates generally not greater than 120°,
(b) a portion of each pocket positioned on the outer and inner bearing plates to communicate successively with discharge ports of a thrust collar as it rotates,
(c) a spacer coaxial with, interposed between, and connected to the bearing plates, and with them defining a bearing cage assembly,
(d) an arcuate peripheral surface on the spacer normally tangential to the inside cylindrical surface of a housing whereby the bearing cage may swivel within the housing, (e) a housing for the assemblage, (f) a sealing means positioned in an annular, peripheral groove in the spacer, and engaged with the housing, whereby a pressure difference across the bearing cage assembly can be achieved.

11. A thrust bearing comprising
(a) a housing having an inside cylindrical surface,
(b) a bearing cage assembly in the housing,
(c) a shaft carrying the bearing cage assembly,
(d) an arcuate peripheral surface on the bearing cage assembly normally tangential with the inside cylindrical surface of the housing, whereby the bearing cage assembly may swivel within the housing,
(e) a sealing means positioned on the periphery of the spacer, and engaged with the housing, whereby a pressure difference in the housing can be generated across the bearing cage assembly,
(f) means for altering the pressure at the outer side of the bearing cage assembly with respect to the pressure at the inner side of the bearing cage assembly; said means inoperative at zero speed of the shaft and increasingly effective with increasing speed of the shaft to generate a force R, R being a force of preferred magnitude and direction across the bearing cage assembly.

12. A thrust bearing in accordance with claim 11 in which the means for altering the pressure at the outer side of the bearing cage assembly is
(a) a jet in the housing,
(b) a diffuser receiving the discharge from the jet,
(c) the jet and diffuser defining together an eductor,
(d) the housing having a chamber communicating between the jet and diffuser,
(e) the housing also having a passage connecting the chamber adjacent to the jet with a cavity adjacent to the outer side of a bearing cage assembly,
(f) the eductor effective with respect to the passage, to alter the pressure in the cavity.

13. A thrust bearing comprising
(a) a shaft,
(b) a driving means mounted at the middle of the shaft,
(c) a pump mounted on one end of the shaft,
(d) a thrust bearing mounted in counterbalancing relation to the pump at the other end of the shaft,
(e) a bearing supporting the shaft between the pump and the driving means,
(f) a bearing supporting the shaft between the thrust bearing and the driving means,
(g) a housing for the shaft, pump, driving means and thrust bearing,
(h) a conduit interconnecting the intake port for the pump with the outer face of the thrust bearing,
(i) a conduit interconnecting the opposite sides of the driving means.

References Cited by the Examiner
UNITED STATES PATENTS

| | | | |
|---|---|---|---|
| 1,591,361 | 7/1926 | Church | 308—168 |
| 1,609,496 | 12/1926 | Reed | 308—170 |
| 1,787,088 | 12/1930 | Schleyer | 103—87 |
| 2,289,053 | 7/1942 | Watres | 308—168 X |
| 2,933,044 | 4/1960 | Williams | 103—87 |

ROBERT M. WALKER, *Primary Examiner.*